(12) United States Patent
Kazmi (10) Patent No.: US 8,996,054 B2
(45) Date of Patent: Mar. 31, 2015

(54) DYNAMIC SAR EMISSION CONTROL TO MINIMIZE RF EXPOSURE

(75) Inventor: Muhammad Kazmi, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 759 days.

(21) Appl. No.: 13/120,961

(22) PCT Filed: Mar. 10, 2011

(86) PCT No.: PCT/SE2011/050262
§ 371 (c)(1),
(2), (4) Date: Mar. 25, 2011

(87) PCT Pub. No.: WO2012/067563
PCT Pub. Date: May 24, 2012

(65) Prior Publication Data
US 2012/0231784 A1    Sep. 13, 2012

Related U.S. Application Data (60) Provisional application No. 61/414,190, filed on Nov. 16, 2010.

(51) Int. Cl.
*H04B 7/00* (2006.01)
*H04W 36/00* (2009.01)
(Continued)

(52) U.S. Cl.
CPC ......... *H04B 1/3838* (2013.01); *H04W 36/0072* (2013.01); *H04W 36/30* (2013.01); *H04W 52/367* (2013.01)
USPC .............. 455/522; 455/69; 455/70; 455/423; 455/425; 370/315; 370/316; 370/317; 370/318; 370/319

(58) Field of Classification Search
USPC .............................. 455/522, 69–70, 423, 425; 370/315–320
See application file for complete search history.

(56) References Cited

U.S. PATENT DOCUMENTS

| 7,610,027 B2 * | 10/2009 | Alapuranen ................... 455/117 |
| 8,538,351 B2 * | 9/2013 | Wilson et al. .............. 455/127.1 |
| 2003/0228875 A1 | 12/2003 | Alapuranen |

(Continued)

FOREIGN PATENT DOCUMENTS

| EP | 1 248 379 A1 | 9/2002 |
| EP | 1248379 A1 * | 10/2002 |
| JP | 2009232437 | 10/2009 |

OTHER PUBLICATIONS

Translation of EP 1,248,379.*
International Search Report mailed Aug. 4, 2011 in corresponding International Application No. PCT/SE2011/050262.
Written Opinion of the International Searching Authority mailed Aug. 4, 2011 in corresponding International Application No. PCT/SE2011/050262.

(Continued)

*Primary Examiner* — Fayyaz Alam (57) ABSTRACT

A network node determines one or more parameters related to a Specific Absorption Rate (SAR) target, where SAR is a measure of a maximum energy or power absorbed by a unit of mass of tissue exposed to radio frequency (RF) electromagnetic field (EMF) radiation generated as a result of radio transmissions generated by a UE. The network node generates content for a message for transmission to the UE including the determined one or more SAR-related parameters to be applied by a transmitter in the UE. Based on those one or more SAR-related parameters, the UE determines and implements an action in order to meet the SAR target. Other example embodiments permit the UE to determine the SAR-related parameters in other ways.

23 Claims, 3 Drawing Sheets

(51) Int. Cl.
*H04W 36/30* (2009.01)
*H04W 52/36* (2009.01)

(56) References Cited

U.S. PATENT DOCUMENTS

| | | | |
|---|---|---|---|
| 2004/0176125 A1* | 9/2004 | Lee | 455/522 |
| 2005/0113125 A1* | 5/2005 | Kang | 455/522 |
| 2006/0120330 A1* | 6/2006 | Lee | 370/331 |
| 2012/0071195 A1* | 3/2012 | Chakraborty et al. | 455/522 |
| 2013/0157592 A1* | 6/2013 | Montgomery et al. | 455/78 |
| 2013/0252658 A1* | 9/2013 | Wilson et al. | 455/522 |

OTHER PUBLICATIONS

3GPP TS 36.101, v. 10.1.1, 2011, TOC + pp. 41-44.
3GPP TS 25.101, v. 10.0.1, 2011, TOC + pp. 26-49.
3GPP TR 34.925, v. 3.0.0, 1999, TOC + pp. 1-13.
"Guidelines for Limiting Exposure to Time-Varying Electric, Magnetic, and Electromagnetic Fields (Up to 300 GHz)", *ICNIRP Guidelines*, vol. 74, No. 4, Apr. 1998, pp. 494-522.
ICNRP Statement on the "Guidelines for Limiting Exposure to Time-Varying Electric, Magnetic, and Electromagnetic Fields (Up to 300 GHz)", *ICNIRP Statement*, vol. 97, No. 3, Sep. 2009, pp. 257-258.

* cited by examiner

DYNAMIC SAR EMISSION CONTROL TO MINIMIZE RF EXPOSURE

This application is the U.S. national phase of International Application No. PCT/SE2011/050262 filed 10 Mar. 2011 which designated the U.S. and claims priority to U.S. Provisional Application No. 61/414,190 filed 16 Nov. 2010, the entire contents of each of which are hereby incorporated by reference.

TECHNICAL FIELD

The technology relates to radio communications, and in particular, to radio transmission control as it relates to specific absorption rate (SAR) requirements.

BACKGROUND

Figure 1:
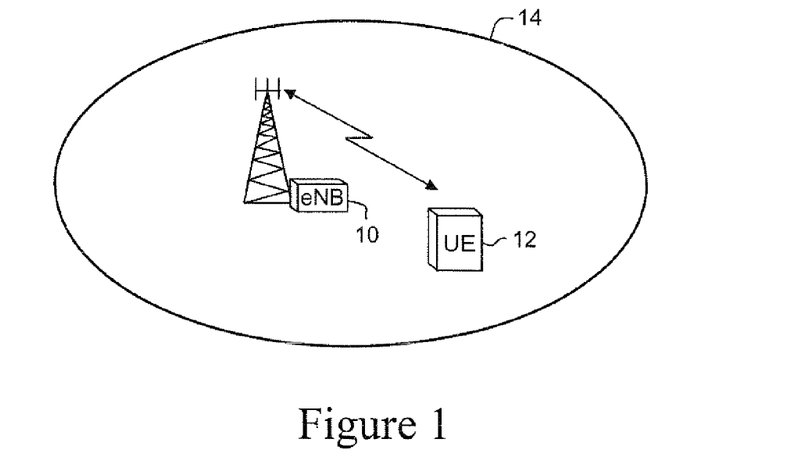
FIG. 1 shows a cellular communication system with a serving node serving a user equipment (UE) located within the serving node's geographical area of service or cell.

FIG. 1 shows a cellular communication system with a serving node 10 (depending on the system, it can be called a base station, a Node B, an evolved Node B (eNodeB or "eNB), etc.) that serves a user equipment (UE) 12 located within the serving node's geographical area of service, called a cell 14. Communication is bidirectional between the eNB 10 and the UE 12. Communications from the eNB 10 to the UE 12 are referred to as taking place in a downlink direction, whereas communications from the UE 12 to the eNB 10 are referred to as taking place in an uplink direction.

In E-UTRAN, Orthogonal Frequency Division Multiple Access (OFDMA) technology is used in the downlink, and single carrier frequency division multiple access (SC-FDMA) in the uplink. In both the uplink and downlink, the data transmission is split into several sub-streams, where each sub-stream is modulated on a separate sub-carrier. Hence, in OFDMA based systems, the available bandwidth is sub-divided into several resource blocks (RB). A resource block is defined in both time and frequency. According to the current assumptions, a resource block size is 180 KHz and 0.5 ms in frequency and time domains, respectively. The overall uplink and downlink transmission bandwidth can be as large as 20 MHz. Carrier aggregation in LTE enables the UE to substantially enhance the data rate by simultaneously receiving and transmitting data over more than one component carrier.

The UE must be in compliance with relevant national and international standards and regulations regarding human exposure to radiofrequency (RF) electromagnetic fields (EMF). The exposure limits specified in these standards have been adopted from guidelines provided by the International Commission on Non-Ionizing Radiation Protection (ICNIRP, 1998) or from the C95.1 standard developed by the Institute of Electrical and Electronics Engineers (IEEE C95.1, 1999). The limits in these recommendations are similar and they have been based on the same scientific data. The ICNIRP guidelines, which are the most widely used recommendations, have been endorsed by the World Health Organization (WHO).

The science-based RF exposure limits specified in these guidelines have been set with substantial safety margins. They provide protection from all established health effects from short-term and long-term exposure to RF fields, and the safety of children and other segments of the population have been taken into account.

Specific Absorption Rate (SAR) is the quantity used to measure the RF exposure to RF EMF transmitted by the UE. SAR is a measure of the maximum energy absorbed by a unit of mass of exposed tissue, over a given time or more simply the power absorbed per unit mass. The ICNIRP SAR limit applicable for mobile phones and other UE used closed to the body is 2 W/kg averaged over 10 gram of tissue. This limit is used within the EU and most countries worldwide. The US Federal Communications Commission (FCC) has adopted the IEEE 1999 SAR limit of 1.6 W/kg averaged over 1 gram of tissue. This limit is also used in a few other countries. The SAR limit in Europe and in some other countries is 2 W/kg, which is set by the European regulators. In other regions of the world, the SAR requirements may be different.

Although SAR requirements are set by the regulators in different countries, they do not exist in the 3GPP specification. For example, no SAR requirements are specified for the GSM, HSPA, or LTE UEs. Due to lack of standardized/harmonized SAR requirements, different UEs may exhibit different SAR levels.

A UE should comply with the SAR limit issued by the individual government of the country/region/province. The UE SAR is measured with a model that assumes a phone is close to the ear. Hence the maximum UE output power is limited by the SAR limit. In the 3GPP HSPA specification 3GPP TS 25.101, "User Equipment (UE) radio transmission and reception (FDD)," only UE power class 3 and power class 4 are specified with the maximum output power for a UE of power class 3 being 24 dBm and for a UE of power class 4 being 21 dBm. In the 3GPP LTE specification, 3GPP TS 36.101, "Evolved Universal Terrestrial Radio Access (E-UTRA) and Evolved Universal Terrestrial Radio Access (E-UTRAN); User Equipment (UE) radio transmission and reception," only UE power class 3 is specified with the maximum output power of 23 dBm.

There are multiple factors that impact the experienced SAR from a UE for an end user. Some factors are listed below as examples. One is a distance between the UE and the human body. According to the characteristic of the radio transmission, the electromagnetic wave strength decreases dramatically (e.g., several tens of dBs) when the phone moves from close to the ear (e.g., 1 cm) to a small distance (e.g., half or 1 wave-length). For a wireless communication system operating at around 2 GHz frequencies, the wavelength is around 15 cm. Example 1: For a UE used in machine to machine communication, the SAR experienced by the end user is far lower than SAR limit because the UE is far enough from the end user during operation. Example 2: When a user uses the UE (could be a cell phone or a dongle) as a wireless access adapter for a laptop or desktop to access the internet, the UE is located near the laptop and thus far enough from the end users. In this case, the SAR experienced by the end user is also far lower than the SAR limit imposed on the UE.

A second example factor is a distance between UE and base station. With a larger distance from the UE to the connected base station, a larger UE transmit power is needed to meet a required Quality of Service (QoS), which increases the SAR experienced by the end users. A third example factor is the surroundings and radio environment of the communication area. The obstacles between the UE and the base station can increase the electromagnetic wave propagation loss. In order to meet the required QoS, a larger transmit power is needed and consequently causes larger SAR experienced by the end user.

In addition to the SAR, the UE also has to fulfill a certain set of out-of-band (OOB) emission requirements. Some of these are set by regulatory bodies, e.g., ITU-R, FCC, ARIB, ETSI, etc. These out of band emission requirements are also referred to as regulatory radio requirements. The objective of OOB requirements is to limit the interference caused by the transmitter (UE or broadcasting equipment (BE)) outside its operating bandwidth to the adjacent carriers. Unlike SAR, the OOB requirements are well specified in 3GPP specifications. For a UTRA UE, they are specified in TS 25.101. For an E-UTRA UE, they are specified in TS 36.101. The OOB requirements typically comprise: adjacent channel leakage ratio (ACLR), spectrum emission mask (SEM), and spurious emissions, the specific definition of which can vary from one system to another. Furthermore, the OOB emission requirements have to be fulfilled on a time slot basis in WCDMA and on a sub-frame basis in E-UTRA.

The efficiency of a UE's power amplifier (PA) is an important factor in conserving the UE battery power. Therefore, an efficient PA will be typically designed for certain typical operating points or configurations, e.g., modulation type, number of active reference blocks (in the case of E-UTRA), number of physical channels/channelization codes/spreading factors (in the case of UTRA, which is based on CDMA technology). However, the UE may have to transmit using any combination of modulation, resource blocks, etc. Therefore, in some uplink (UL) transmission scenarios, the UE power amplifier may not be able to operate in the linear zone, thereby causing OOB band emissions due to harmonics. To ensure that UE fulfills OOB requirements for all allowed UL transmission configurations, (e.g., may include factors such as modulation type, number of resource blocks, etc.), the UE can reduce its maximum UL transmission power in some scenarios when it reaches its maximum power. This is called maximum power reduction or UE power back-off. For instance, a UE with nominal maximum output/transmit power of 24 dBm power class may reduce its maximum power from 24 dBm to 23 or 22 dBm depending upon the UL transmission configuration.

The maximum power reduction (MPR) values for different UL transmission configurations are generally well specified in the standard. The UE uses these values to apply MPR when the conditions for the corresponding configurations are fulfilled. These MPR values are regarded as static in a sense that they are independent of resource block allocation and other deployment aspects.

Additional maximum power reduction (A-MPR) may be needed to meet additional OOB requirements. In E-UTRA, an additional MPR (A-MPR) is also being specified on top of the normal MPR to meet additional OOB emission requirements, which cannot be met by only MPR. The difference between A-MPR and MPR is that the former is not fully static. Instead, A-MPR can vary between different cells, operating frequency bands, and between cells belonging to different location areas.

The A-MPR includes all the remaining power reduction (on top of the normal MPR) needed to account for factors such as bandwidth, frequency band, and resource block allocation to satisfy additional requirements such as requirements set by regional regulatory bodies (FCC, ARIB etc). Table 6.2.4-1, "Additional Maximum Power Reduction (AMPR)," in TS 36.101 illustrates how A-MPR requirements are currently defined for E-UTRA UE.

One possible approach is to specify a fixed, predefined SAR value which the UE should meet regardless of the scenario. But the SAR requirement may depend upon the scenario, e.g., country, region, regulator, standard, etc. In order to meet the fixed SAR requirement, the UE may have to reduce its maximum output power. In some scenarios, a fixed SAR value may result in excessive UE power backoff or in smaller than required reduction in UE output power. Furthermore, future SAR requirements may change, i.e., may become more stringent or less stringent. So there is a need for UEs to be adaptable to different and changing SAR requirements.

SUMMARY

One aspect of the technology in this application relates to dynamic SAR emission control for a radio user equipment (UE). The UE receives from a radio communications network one or more parameters related to a Specific Absorption Rate (SAR) target. The SAR is a measure of a maximum energy or power absorbed by a unit of mass of tissue exposed to radio frequency (RF) electromagnetic field (EMF) radiation generated as a result of radio transmissions generated by the UE. The UE determines and implements an action it should take in order to meet the SAR target based on the one or more SAR-related parameters. As one example action, the UE reduces the UE's maximum output power in order to meet the SAR target.

In an example, non-limiting embodiment, the SAR target may be a first SAR target associated with a first scenario or a second SAR target associated with a second different scenario. The first scenario may be a first region having a first SAR requirement, and the second scenario may be a second region having a second SAR requirement. The first SAR requirement and the second SAR requirement may be the same or different. The one or more SAR-related parameters may include, for example, transmission power backoff information for the UE that indicates or allows the UE to determine how much to reduce the UE's maximum transmit power. The first SAR target may be associated with a first transmission backoff amount, and the second SAR target may be associated with a second transmission backoff amount. In a non-limiting example implementation, the first SAR target may be a modified version of the second SAR target, and the first transmission backoff amount is not lower than a required transmission backoff to accommodate the modification of the second SAR target.

The one or more SAR-related parameters may include for example a SAR value and/or timing information related to a time period over which the UE should meet the required SAR target.

In one example implementation, the one or more SAR-related parameter values may be received using available existing signaling parameters such as existing spurious emission requirement signaling parameters.

The technology may also be applied to handover situations from a source cell to a target cell. The UE receives in a handover message one or more target cell, SAR-related parameters whose values are tailored to a target cell SAR target associated with the target cell. Based on the one or more target cell, SAR-related parameters, the UE determines and implements another action to be taken by the UE in order to meet the target cell SAR target.

Another aspect of the technology relates to a first network node communicating with the UE. The first network node determines one or more parameters related to a SAR target and generates content for a message for transmission to the UE including the determined one or more SAR-related parameters to be applied by a transmitter in the UE in order to meet the SAR target. In one non-limiting example embodiment, the first network node may signal the content to the UE. In another non-limiting example embodiment, the first network node may signal the content to a second network node.

For the handover situation, the first network node generates content for a message for transmission to the UE including one or more target cell, SAR-related parameters associated with a target handover cell to be applied by a transmitter in the UE when the UE is handed over to the target handover cell. In a non-limiting example, the first network node may receive the one or more target cell, SAR-related parameters from a third network node.

Another aspect of the technology relates to a UE configured to communicate with a network over a radio interface. The UE includes radio transmission and reception circuitry coupled to processing circuitry configured to (1) determine SAR-related input, (2) determine a transmit power to conform with a SAR target that is based on the SAR-related input, and (3) control operating of the radio transmission circuitry to conform with the SAR target based on the determined transmit power. In one non-limiting example, wherein the processing circuitry is configured to detect and communicate to a UE subscriber a location associated with the UE, detect a SAR-related input from the UE subscriber, and use that SAR-related input to determine the SAR target. In another non-limiting example, the processing circuitry is configured to detect and communicate to a UE subscriber a location associated with the UE, detect a SAR-related input from a predetermined SAR-related input associated with the detected location, and use that predetermined SAR-related input to determine the SAR target. Alternatively, the SAR-related input may be received from the network.

Another aspect of the technology relates to a first network node configured to communicate with a UE which includes processing circuitry configured to (1) determine one or more parameters related to a Specific Absorption Rate (SAR) target, where SAR is a measure of a maximum energy or power absorbed by a unit of mass of tissue exposed to radio frequency (RF) electromagnetic field (EMF) radiation generated as a result of radio transmissions generated by the UE, and (2) generate content for a message for transmission to the UE including the determined one or more SAR-related parameters to be applied by a transmitter in the UE in order to meet the SAR target. The first network node also includes interface circuitry configured to provide the message for transmission.

The first network node may be one of a base station, base station controller, core network node, or relay node.

In an example handover application, the interface circuitry is configured to signal the one or more target cell, SAR-related parameters to a second network node that controls the target handover cell. The second network node may be one of a base station, radio network controller, base station controller, core network node, relay node, positioning node, self-organizing network (SON) node, or operations and maintenance node.

Alternatively, the first network node is configured to receive the one or more target cell, SAR-related parameters from a third network node. The third network node may be one of a base station, radio network controller, base station controller, core network node, relay node, positioning node, self-organizing network (SON) node, or operations and maintenance node.

DETAILED DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, interfaces, circuits, and devices are omitted so as not to obscure the description with unnecessary detail. Individual blocks are shown in the figures corresponding to various nodes. Those skilled in the art will appreciate that the functions of those blocks may be implemented using individual hardware circuits, using software programs and data in conjunction with a suitably programmed digital microprocessor or general purpose computer, and/or using applications specific integrated circuitry (ASIC), and/or using one or more digital signal processors (DSPs). Nodes that communicate using the air interface also have suitable radio communications circuitry. The software program instructions and data may be stored on computer-readable storage medium, and when the instructions are executed by a computer or other suitable processor control, the computer or processor performs the functions.

Thus, for example, it will be appreciated by those skilled in the art that diagrams herein can represent conceptual views of illustrative circuitry or other functional units. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various illustrated elements may be provided through the use of hardware such as circuit hardware and/or hardware capable of executing software in the form of coded instructions stored on computer-readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

The technology may be applied to any cellular communications system and/or network. Herein, a radio user equipment (UE) is understood to be any type of mobile radio node, e.g., mobile station (MS), terminal, laptop, PDAs, small base station, sensor, relay, etc. A network node can be a base station node, relay node, base station control node, or core network node.

The technology in this application includes a first network node signaling a UE information such as one or more SAR parameters (e.g., power backoff, a time period, etc.) to be applied by the UE transmitter in order to meet a SAR requirement. Specific Absorption Rate (SAR) is a quantity used to measure the RF exposure to RF EMF transmitted by the UE. SAR is a measure of the maximum energy absorbed by a unit of mass of exposed tissue over a given time, or more simply, the power absorbed per unit mass. Non-limiting example SAR limits include 2 W/kg averaged over 10 gram of tissue, (used within the EU and other countries worldwide), and the U.S. Federal Communications Commission (FCC)-adopted IEEE 1999 SAR limit of 1.6 W/kg averaged over 1 gram of tissue. The UE receives that SAR-related information (e.g., one or more SAR parameters) related to the SAR requirement and determines, based on the received information, an amount of that the UE output power ($\Delta P$) is to be reduced in order to meet the SAR requirement. The UE then reduces its maximum output power by the determined amount (e.g., a backoff power). The first network node may also signal to a second network node information like the one or more SAR parameters as explained further below.

Non-limiting examples of a first network node include (but not limited to) a core network node, a radio network controller, a base station, or a relay node which may be fixed or mobile. Non-limiting examples of a network controller are an RNC in HSPA, BSC in GSM or BSC in CDMA2000 (e.g. CDMA200 1xRTT, HRPD) etc. Non-limiting examples of the BS includes an eNode B in LTE, Node B in HSPA, BTS in GSM, BS in CDMA2000, etc. Non-limiting examples of the first network node and second network nodes may be the same as for serving network nodes and other network nodes such as positioning node (e.g. E-SMLC in LTE), core network node (e.g. MME in LTE) etc. Non-limiting examples of a third network node are Operation and Maintenance (O&M), Operational Support Systems (OSS), Self Organizing Network (SON), core network node, network controller, base station controller, base station, relay, positioning node, etc.

Figure 2:
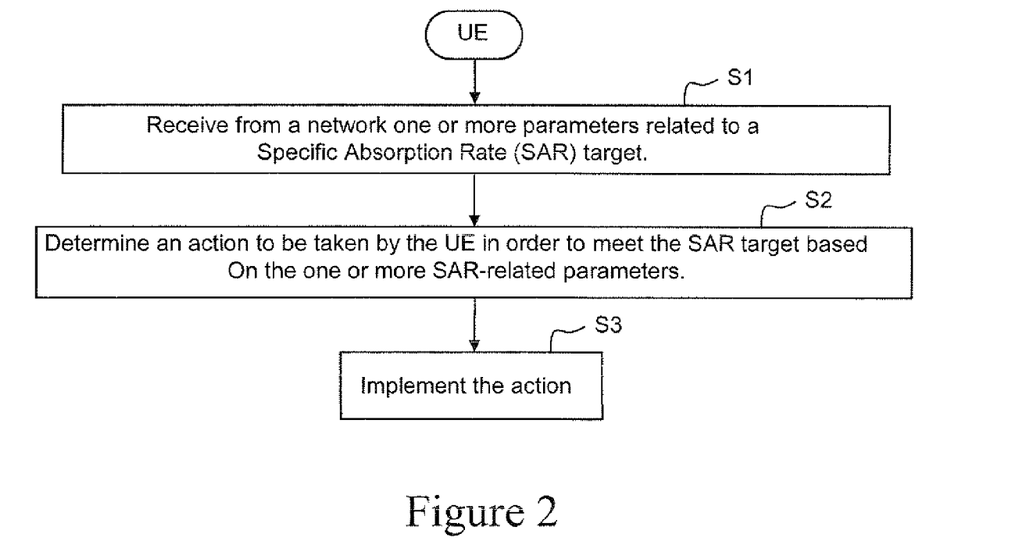
FIG. 2 is a non-limiting flowchart illustrating example procedures followed by a UE regarding SAR signaling received from the network.

FIG. 2 is a non-limiting flowchart illustrating example procedures followed by a UE regarding SAR signaling received from the network. The UE receives from a radio communications network one or more parameters related to a Specific Absorption Rate (SAR) target (step S1). The UE determines an action to be taken by the UE in order to meet the SAR target based on the one or more SAR-related parameters (step S2) and implements the action (step S3).

Figure 3:
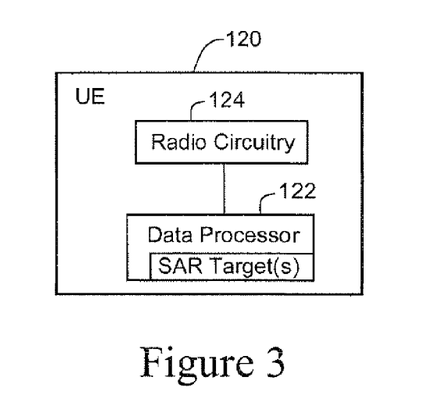
FIG. 3 is a non-limiting, example function block diagram of a UE.

FIG. 3 is a non-limiting, example function block diagram of a UE 120 for implementing the SAR-related functions described for the UE in this application. The UE 120 includes radio circuitry 124 such as one or more antennas, a radio receiver including one or more filters and frequency down-conversion circuitry, a radio transmitter including one or more filters, frequency up-conversion circuitry, and one or more power amplifiers, and baseband processing circuitry. The UE 120 also includes one or more data processors 122 with memory. The UE 120 receives the SAR target(s) information from the network and the data processor 122 stores it in the memory. The data processor 122 uses the SAR target(s) information to control the transmit power of the UE radio transmitter, e.g., via controlling the gain of the power amplifier.

Figure 4:
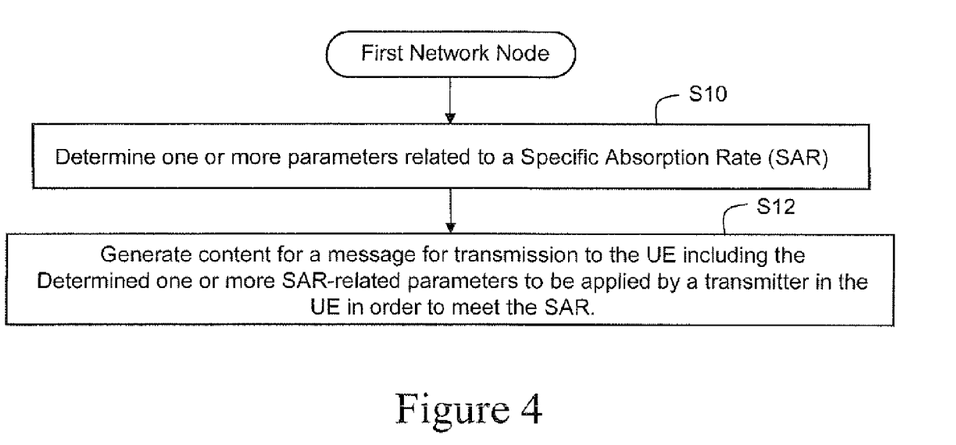
FIG. 4 is a non-limiting flowchart illustrating example procedures followed by a first network node regarding SAR signaling.

FIG. 4 is a non-limiting flowchart illustrating example procedures followed by a first network node regarding SAR signaling. The first network node determines one or more parameters related to a SAR target (step S10) and generates content for a message for transmission to the UE including the determined one or more SAR-related parameters to be applied by a transmitter in the UE in order to meet the SAR target (step S12).

Figure 5:
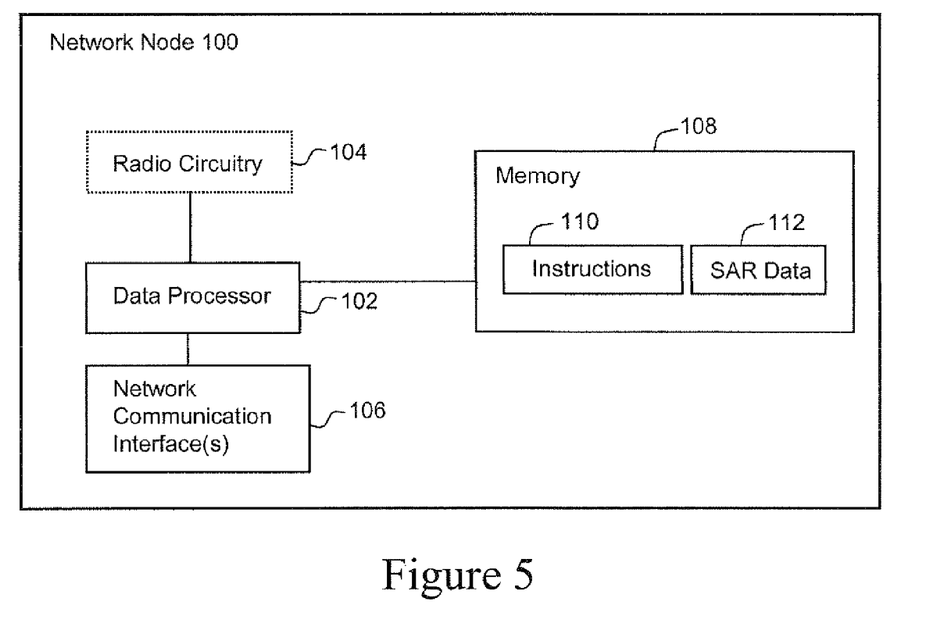
FIG. 5 is a non-limiting, example function block diagram of a first network node.

FIG. 5 is a non-limiting, example function block diagram of a network node 100 that may be used to implement network operations described herein. A data processor 102 controls overall operation of the network node 100. The network node 100 may be a radio network node (some sort of base station or access point), and in that example case, includes radio communications circuitry 104 including if desired multiple RAT, carrier aggregation radio circuitry. Alternatively or additionally, the network node 100 may be a core network or other type of network node (examples are listed above) where radio circuitry may not be needed unless that node communicates wirelessly. The data processor 102 connects to one or more network communication interface(s) 106 and to memory 108. The memory 108 includes program instructions 110 for performing the network node functions described herein relating to determining and signaling SAR related information intended for one or more UEs. The structure of the network node is suitable for implementing the first, second, and/or third network nodes described in various example scenarios below.

The serving first network node signals one or more SAR parameters to the UE related to the SAR requirement to be met by the UE. The serving network node can signal the one or more SAR parameters to the UE via a lower layer signaling (e.g., MAC, L1/L2) or via higher layer signaling (e.g., RRC). The one or more SAR parameters can be signaled to each UE on UE-specific signaling. Alternatively or in addition, the one or more SAR parameters can be sent to all UEs or to a group of UEs on a broadcast channel, e.g., PDSCH in LTE. The one or more SAR parameters may depend upon the UE capability, e.g., if the UE supports simultaneous speed and data services on CDMA2000 and LTE, etc.

In a non-limiting example embodiment, the network-signaled one or more SAR parameters are defined as new set of parameters. However, in another non-limiting example embodiment, one or more of some existing parameter(s) already signaled to the UE for some other purpose may also be used for signaling one or more SAR requirements. An example of a network-signaled (NS_x) parameter that may be used for additional spurious emission requirements is defined in 3GPP TS 36.101, "Evolved Universal Terrestrial Radio Access (E-UTRA) and Evolved Universal Terrestrial Radio Access (E-UTRAN); User Equipment (UE) radio transmission and reception," incorporated herein by reference.

The SAR parameter(s) can be expressed in different forms. In one example, the SAR parameter can be expressed in terms of the amount of power backoff to be applied by the UE in order to meet the SAR requirement(s), e.g., 3 dB. The SAR parameter can also be an identifier or an index corresponding to a pre-defined value of the required power backoff.

In another non-limiting example, the SAR parameter can be expressed in terms of the absolute value of the SAR which the UE is required to meet or not exceed, e.g., 1.5 W/kg. The SAR parameter can also be an identifier or an index corresponding to a pre-defined value of the required absolute value of the SAR target. The UE may translate the SAR parameter or target into a required transmission power backoff or maximum transmission power reduction. The translation can be done based on a stored, pre-defined table or can be based on some other UE implementation.

In addition, a SAR parameter indicating the time period (T0) over which the UE should meet the SAR requirement can also be signaled to the UE by the serving network node. This non-limiting example embodiment may be useful in different regions where the period over which the SAR requirement may differ. The signaled value can either be an absolute value (e.g., 10 ms or 10 TTI or 10 subframes) or an identifier or index of one of pre-defined measurement periods (e.g., 0 and 1 corresponding to measurement periods of 5 ms and 10 ms, respectively).

The UE may interpret a received network-signaled SAR parameter to determine the amount of power reduction required. The SAR parameter might denote an absolute value of the power backoff. For example, if the signaled value is 3 dB, then the UE reduces its max output power by 3 dB from 23 dBm to 20 dBm. The UE may also apply additional power backoff (i.e., beyond the SAR target requirement) due to other reasons such as to meet out-of-band emission requirements.

If the signaled value represents an absolute value of the SAR which the UE is required to meet (e.g., 1.5 W/kg), then the UE may map the SAR value into a required power backoff or maximum power reduction. The mapping can be based on a pre-defined lookup table. The mapping may depend upon the UE implementation. Eventually, the UE needs to apply the mapped value to meet the SAR requirement. If a measurement period over which the SAR requirement to be met is also signaled to the UE, (as explained earlier), then the power reduction should be met over the signaled time value. Alternatively, a pre-defined time period may be used.

A third aspect of the technology relates to exchanging SAR requirements between network nodes. In one example, the exchanged SAR information is between first and second network nodes such as over an X2 interface between first and second eNode Bs in LTE. The first network node may signal the SAR parameter value(s) (used in the first network node) to the second network node. In one example, the exchange of the SAR parameter value(s) may enable a serving network node to know the SAR parameter values used in one or more neighboring network nodes.

In another example, the first network node may be the serving node and the second network node is a network controller, e.g., RNC in HSPA, a core network node, a positioning node (e.g. E-SMLC server in LTE), etc. For instance, the serving node (e.g., eNode B) may signal the parameter values to the E-SMLC over the LPPa interface in LTE. The signaling of a SAR parameter between the nodes (e.g., over X2 in LTE) can be sent using a transparent container or in a non-transparent manner. In case of a transparent container, the serving node forwards the received values from the target nodes directly to the UE.

Figure 6:
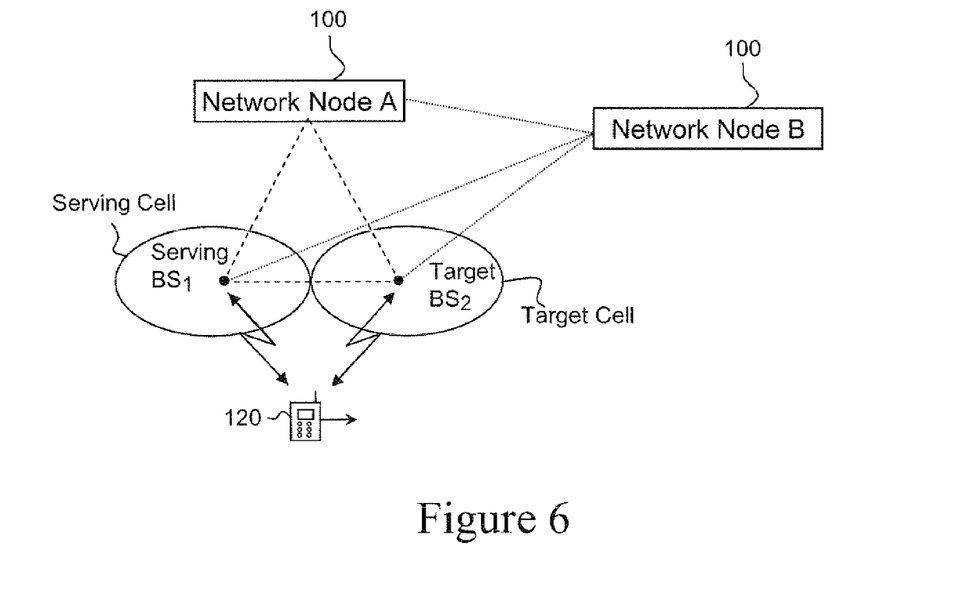
FIG. 6 is a diagram showing various non-limiting example SAR signaling arrangements for a handover situation.

The SAR parameter values may also be required prior to a handover or cell reselection. FIG. 6 is a diagram showing various non-limiting example SAR signaling arrangements for a handover situation. A network node A 100 communicates SAR information with a serving base station $BS_1$ in a serving cell and a target base station $BS_2$ in a target cell. The serving base station $BS_1$ and the target base station $BS_2$ are also shown as possibly communicating SAR information with each other.

The serving base station $BS_1$ and the target base station $BS_2$ are shown supporting a handover of UE 120 moving from the serving cell towards the target cell. One or more SAR parameter(s) for use in the handover target cell can be signaled by the serving base station $BS_1$ to the UE via a handover command or in another message. In this way, the UE 120 entering the target handover cell can apply the correct power backoff values in order to meet the SAR requirement for the target cell.

In another example embodiment, the values of the network-signaled SAR parameter(s) may be signaled from another network node B 100. For example, a Self Organizing Network (SON) node may set the values of the SAR parameter(s) in one or more base stations. The values of the SAR parameter(s) may depend upon the region, country, province, etc. and may also be modified over the time even in the same geographical region.

Non-limiting examples of technologies/RATs which may use the technology described here include: E-UTRA FDD, E-UTRA TDD, UTRA TDD, GSM/GERAN/EDGE, 3GPP2 CDMA technologies (e.g. CDMA2000 1x RTT and HRPD), etc. Furthermore, the technology may also apply to a multi-carrier or carrier aggregation (CA) capable UE where the UE receives and/or transmits using more or more carriers simultaneously. The CA system may belong to any technology, e.g., HSPA or LTE. The CA system may also be multi-RAT system, i.e., CA comprising HSPA and LTE carriers. In HSPA, examples of multi-carrier systems include DC-HSDPA, DC-HSUPA, DB-DC-HSDPA, 4C-HSDPA, 8C-HSDPA, MC-HSPA, etc.

In another non-limiting embodiment, the SAR parameters may be configured by the UE based on the UE detecting its region or location and prompting the UE subscriber to choose from multiple SAR values, e.g., low, medium, and high SAR values. These options can be displayed or read out using an application program which can be installed in the UE by the subscriber. The program may also be downloaded by the operator in the background during the initial setup, periodically (e.g., once in a day or a week), at any suitable time, or when UE enters in a new location area, country or region. One SAR value may even be indicated as recommended or as a default value. For safety purposes, the recommended value can be a medium or high value of the SAR for which the UE should take an action, e.g., reduces its maximum output power. The UE then implements the SAR value selected by the subscriber and takes the necessary action.

In another non-limiting embodiment, the SAR parameters may be configured by the UE based on the UE detecting its region or location and selecting one of one or more predetermined SAR values linked to or associated with the detected UE location. A mapping table linking the predetermined SAR values and the associated locations where they should be used can be stored in the UE at the time of development. The mapping table may also be signaled to the UE by the network at the time of initial setup or at any time or when the UE's location area is changed, e.g., UE is entering new tracking area, new country, state, or region. The UE then implements the SAR value selected based on the predetermined or configured mapping table and takes the necessary action, i.e., reduces its maximum power. One SAR value may even be indicated as recommended or as a default value. For the safety purposes, the recommended value can be a medium or high value of the SAR for which the UE should take an action, e.g., reduces its maximum output power. The recommended or default value can be used when the UE cannot accurately find its location. For example, a UE using a global navigational satellite system (GNSS) such as Assisted-GPS (A-GPS) may not recognize its location when located inside a building.

There are several advantages to the technology described. For example, network operators can employ and enforce different SAR requirements in different regions according to local requirements and/or different scenarios. Another advantage is that UEs can be prevented from excessive UE transmit power reduction if SAR requirements are modified. Yet another advantage is that the UE subscriber does not need to purchase new UE just because the SAR requirements change in certain region. The UE subscriber may also freely roam in any region without any concern about different SAR requirements in different parts of the world. One of the methods also enables the UE subscriber to choose the SAR values thereby allowing the subscriber for example to select a SAR value in accordance with the actual or intended use of the UE. For example, if the intended use of the UE is not close to the human body, then a lower SAR value can be chosen which leads to a lower reduction of the UE power as compared to a fixed SAR value.

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. No claim is intended to invoke paragraph 6 of 35 USC §112 unless the words "means for" or "step for" are used. Furthermore, no embodiment, feature, component, or step in this specification is intended to be dedicated to the public regardless of whether the embodiment, feature, component, or step is recited in the claims.

The invention claimed is:

1. A method in a radio user equipment (UE), comprising:
receiving from a radio communications network one or more parameters related to a Specific Absorption Rate (SAR) target, where the one or more SAR-related parameters includes an SAR value that the UE is required to meet, and where SAR is a measure of a maximum energy or power absorbed by a unit of mass of tissue exposed to radio frequency (RF) electromagnetic field (EMF) radiation generated as a result of radio transmissions generated by the UE;
based on the one or more SAR-related parameters, determining an action to be taken by the UE in order to meet the SAR target,
wherein the UE receives from the radio communications network one or more parameters related to a first SAR target associated with a first scenario and wherein the UE receives from the radio communications network one or more parameters related to a second different SAR target associated with a second different scenario,
wherein the one or more SAR-related parameters includes timing information related to a time period over which the UE should meet the SAR target; and
implementing the action including meeting the SAR target within the time period.

2. The method in claim 1, wherein the first scenario is a first region having a first SAR requirement and the second scenario is a second region having a second SAR requirement.

3. The method in claim 1, wherein the one or more SAR-related parameters includes transmission power backoff information for the UE that indicates or allows the UE to determine how much to reduce the UE's maximum transmit power, and wherein the first SAR target is associated with a first transmission backoff amount and the second SAR target is associated with a second transmission backoff amount.

4. The method in claim 3, wherein the first SAR target is a modified version of the second SAR target, and wherein the first transmission backoff amount is not lower than a required transmission backoff to accommodate the modification of the second SAR target.

5. The method in claim 1, further comprising:
determining, based on the one or more SAR-related parameter values, an amount the UE is to reduce the UE's maximum output power in order to meet the SAR target, and
reducing the UE's maximum output power by the determined amount.

6. The method in claim 1, wherein the one or more SAR-related parameter values are received using available existing signaling parameters such as existing spurious emission requirement signaling parameters.

7. The method in claim 1, further comprising:
detecting that the UE is to perform a handover operation to a target cell from a source cell;
receiving in a handover message one or more target cell, SAR-related parameters whose values are tailored to a target cell SAR target associated with the target cell;
based on the one or more target cell, SAR-related parameters, determining an other action to be taken by the UE in order to meet the target cell SAR target; and
implementing the other action.

8. A method in a first network node communicating with a radio user equipment (UE), comprising:
determining one or more parameters related to a Specific Absorption Rate (SAR) target, where the one or more SAR-related parameters includes an SAR value that the UE is required to meet, and where SAR is a measure of a maximum energy or power absorbed by a unit of mass of tissue exposed to radio frequency (RF) electromagnetic field (EMF) radiation generated as a result of radio transmissions generated by the UE;
generating content for a message for transmission to the UE including the determined one or more SAR-related parameters to be applied by a transmitter in the UE in order to meet the SAR target; and
signaling the content to a second network node,
wherein the one or more SAR-related parameters includes timing information related to a time period over which the UE should meet the SAR target.

9. The method in claim 8, further comprising:
signaling the content to the UE.

10. The method in claim 8, wherein the first network node generates content for a message for transmission to the UE including one or more target cell, SAR-related parameters associated with a target handover cell to be applied by a transmitter in the UE when the UE is handed over to the target handover cell.

11. The method in claim 10, wherein the first network node receives the one or more target cell, SAR-related parameters from a third network node.

12. A radio user equipment (UE) configured to communicate with a network over a radio interface, the UE comprising:
radio transmission and reception circuitry, and
processing circuitry, coupled with the radio circuitry, configured to:

determine Specific Absorption Rate (SAR)-related input, where the one or more SAR-related parameters includes an SAR value that the UE is required to meet, and where SAR is a measure of a maximum energy or power absorbed by a unit of mass of tissue exposed to radio frequency (RF) electromagnetic field (EMF) radiation generated as a result of radio transmissions generated by the UE;

determine a transmit power to conform with a SAR target that is based on the SAR-related input, wherein the radio transmission and reception circuitry is configured to receive from the radio communications network one or more parameters related to a first SAR target associated with a first scenario and wherein the radio transmission and reception circuitry is configured to receive from the radio communications network one or more parameters related to a second different SAR target associated with a second different scenario;

wherein the one or more SAR-related parameters includes timing information related to a time period over which the UE should meet the SAR target; and control operating of the radio transmission circuitry to conform with the SAR target with the time period based on the determined transmit power.

13. The UE in claim 12, wherein the processing circuitry is configured to detect and communicate to a UE subscriber a location associated with the UE, detect the SAR-related input from the UE subscriber, and use the SAR-related input to determine the SAR target.

14. The UE in claim 12, wherein the processing circuitry is configured to detect and communicate to a UE subscriber a location associated with the UE, detect a predetermined SAR-related input associated with the detected location, and use the predetermined SAR-related input to determine the SAR target.

15. The UE in claim 12, wherein the one or more SAR-related input includes one or more SAR-related parameters associated with a target handover cell to be applied by the radio transmission circuitry when the UE is handed over to the target handover cell.

16. A first network node configured to communicate with a radio user equipment (UE), comprising:

processing circuitry configured to:

determine one or more parameters related to a Specific Absorption Rate (SAR) target, where the one or more SAR-related parameters includes an SAR value that the UE is required to meet, and where SAR is a measure of a maximum energy or power absorbed by a unit of mass of tissue exposed to radio frequency (RF) electromagnetic field (EMF) radiation generated as a result of radio transmissions generated by the UE, and generate content for a message for transmission to the UE including the determined one or more SAR-related parameters to be applied by a transmitter in the UE in order to meet the SAR target, and interface circuitry configured to provide the message for transmission and signaling the content to a second network node, wherein the one or more SAR-related parameters includes timing information related to a time period over which the UE should meet the SAR target.

17. The first network node in claim 16, wherein the first network node is configured to generate content for a message for transmission to the UE including one or more target cell, SAR-related parameters associated with a target cell controlled by a second network node to be applied by a transmitter in the UE when the UE is handed over to the target cell.

18. The first network node in claim 17, wherein the interface circuitry is configured to signal the one or more target cell, SAR-related parameters to a second network node that controls the target handover cell.

19. The second network node in claim 18, wherein the second network node is one of a base station, radio network controller, base station controller, core network node, relay node, positioning node, self-organizing network (SON) node, or operations and maintenance node.

20. The first network node in claim 18, wherein the first network node is configured to receive the one or more target cell, SAR-related parameters from a third network node.

21. The third network node in claim 20, wherein the third network node is one of a base station, radio network controller, base station controller, core network node, relay node, positioning node, self-organizing network (SON) node, or operations and maintenance node.

22. The method in claim 8, wherein:

the one or more SAR-related parameters relate to a first SAR target associated with a first scenario, and the one or more SAR-related parameters relate to a second different SAR target associated with a second different scenario.

23. The first network node in claim 16, wherein:

the one or more SAR-related parameters relate to a first SAR target associated with a first scenario, and the one or more SAR-related parameters relate to a second different SAR target associated with a second different scenario.

\* \* \* \* \*